US009382945B2

(12) United States Patent
Doki-Thonon et al.

(10) Patent No.: US 9,382,945 B2

(45) Date of Patent: Jul. 5, 2016

(54) MECHANICAL DEVICE COMPRISING A BEARING AND A LUBRICATION SYSTEM, IMPLEMENTING MACHINE AND METHOD

(71) Applicants: Thomas Doki-Thonon, Noyal Chatillon sur Seiche (FR); Alexandre Aury, Tournon-sur-Rhône (FR); Pascal Deloeil, Helesmes (FR)

(72) Inventors: Thomas Doki-Thonon, Noyal Chatillon sur Seiche (FR); Alexandre Aury, Tournon-sur-Rhône (FR); Pascal Deloeil, Helesmes (FR)

(73) Assignee: SKF Aerospace France S.A.S, Saint-Vallier (FR)

( * ) Notice: Subject to any disclaimer, the term of this patent is extended or adjusted under 35 U.S.C. 154(b) by 0 days.

(21) Appl. No.: 14/572,873

(22) Filed: Dec. 17, 2014

(65) Prior Publication Data

US 2015/0176645 A1 Jun. 25, 2015

(30) Foreign Application Priority Data

Dec. 23, 2013 (FR) ..................................... 13 63476

(51) Int. Cl.

| | |
|---|---|
| ***F16C 19/00*** | (2006.01) |
| ***F16C 33/10*** | (2006.01) |
| ***F16C 33/66*** | (2006.01) |
| ***F16C 17/10*** | (2006.01) |

(Continued)

(52) U.S. Cl.

CPC ........... *F16C 33/1085* (2013.01); *B23P 15/003* (2013.01); *F16C 11/068* (2013.01); *F16C 17/10* (2013.01); *F16C 33/1055* (2013.01); *F16C 33/586* (2013.01); *F16C 33/6677* (2013.01); *F16C 33/6681* (2013.01); *F16H 57/0423* (2013.01); *F16C 19/38* (2013.01); *Y10T 29/49702* (2015.01); *Y10T 403/259* (2015.01)

(58) Field of Classification Search

CPC ............. F16C 33/1085; F16C 33/6681; F16C 11/068; F16C 33/1055; F16C 33/6677; F16C 17/10; F16C 19/38; F16C 33/586; F16H 57/0423; B23P 15/003; Y10T 403/259; Y10T 29/49702

See application file for complete search history.

(56) References Cited

U.S. PATENT DOCUMENTS

| | | | |
|---|---|---|---|
| 5,106,209 A | 4/1992 | Atkinson et al. | |
| 6,409,464 B1 * | 6/2002 | Fisher ..................... | F01D 25/16 384/475 |
| 7,500,311 B2 * | 3/2009 | Shimomura ............ | F16C 19/26 184/7.4 |

(Continued)

FOREIGN PATENT DOCUMENTS

| | | |
|---|---|---|
| DE | 3024629 A1 | 2/1982 |
| EP | 2175152 A1 | 4/2010 |

(Continued)

*Primary Examiner* — Adam D Rogers

(74) *Attorney, Agent, or Firm* — Bryan Beckjian; SKF USA Inc. Patent Dept.

(57) ABSTRACT

A mechanical device, comprising: a bearing including a fixed ring and a pivoting ring centered on a central axis and including an interface defined therebetween; and an interface lubrication system. An acceleration field pushes the stream of lubricant from a bearing first zone to a bearing second zone, each defining an angular sector around the central axis. The lubrication system comprises a set of peripheral channels passing through the fixed ring and including first channels positioned in the first zone and defining a first intake flow rate for bringing lubricant to the interface and second channels positioned in the second zone and defining a second intake flow rate bringing lubricant to the interface. The first flow rate is higher than the second flow rate. The interface receives a larger quantity of lubricant in the first zone than in the second zone. The mechanical device can be integrated into a machine.

17 Claims, 4 Drawing Sheets

(51) Int. Cl.

| | |
|---|---|
| ***F16C 33/58*** | (2006.01) |
| ***B23P 15/00*** | (2006.01) |
| ***F16C 11/06*** | (2006.01) |
| ***F16H 57/04*** | (2010.01) |
| *F16C 19/38* | (2006.01) |

(56) References Cited

U.S. PATENT DOCUMENTS 8,517,612 B2 * 8/2013 Metzger .................. F16C 33/58 384/475
8,657,501 B2 * 2/2014 Palomba ................. F16C 17/03 384/117
9,121,303 B2 * 9/2015 Dobek .................... F01D 25/16
2014/0254966 A1 * 9/2014 Zhou ....................... F16C 17/02 384/291

FOREIGN PATENT DOCUMENTS

EP 2657463 A1 10/2013
EP 2657553 A1 10/2013
GB 2326694 A 12/1998
WO 2007148228 A1 12/2007

* cited by examiner

MECHANICAL DEVICE COMPRISING A BEARING AND A LUBRICATION SYSTEM, IMPLEMENTING MACHINE AND METHOD

CROSS REFERENCE TO RELATED APPLICATION

This is a United States Non-Provisional Patent Application claiming the benefit of France Patent Application Number FR1363476 filed on 23 Dec. 2013 (23.12.2013), which is incorporated herein by reference in its entirety.

TECHNICAL FIELD OF THE INVENTION

The present invention relates to a mechanical device, comprising a bearing and a lubrication system. The invention also relates to a machine comprising at least one such mechanical device and a method for implementing such a mechanical device. The field of the invention is the lubrication of bearings, in particular rolling bearings, ball and socket joints or smooth bearings.

BACKGROUND OF THE INVENTION

Torque transmission mechanisms for starter motors of internal combustion engines generally comprise a ring gear to which a starting torque is transmitted by a starter motor, and which transmits a torque to a one-way clutch of the torque transmission mechanism.

It is known, for example from WO-A-2007/148228, to provide a ring gear divided, along a radial direction, in three regions including a gear side region, an intermediate region and a race side region. The gear side region meshes with a pinion of the starter motor, while the race side region transmits torque to the one-way clutch.

The three regions are generally welded together using, for example, laser welding or electro beam welding. Such techniques are expensive and complex to implement. Moreover, these techniques need metallic materials of specific properties to be present on the areas which are to be welded. This implies complex manufacturing operations and is also not standard for SKF channel.

The welding process generates a dimensional modification and in consequence no control of bearing clearance.

BRIEF SUMMARY OF THE INVENTION

The aim of the present invention is to propose an improved mechanical device, comprising a bearing and a lubrication system.

To that end, the invention relates to a mechanical device, comprising: a bearing including a fixed ring and a pivoting ring that are centered on a central axis and include an interface defined between them; and a system for lubricating the interface, configured to bring a flow of lubricant from at least one supply channel to the interface through the fixed ring; in which an acceleration field tends to push the stream of lubricant from a first zone to a second zone of the bearing, each defining an angular sector around the central axis. According to the invention, the lubrication system comprises a set of peripheral channels passing through the fixed ring and including, on the one hand, first channels that are positioned in the first zone and that define a first intake flow rate of lubricant to the interface and, on the other hand, second channels that are positioned in the second zone and that define a second intake flow rate up to the interface, the first intake flow rate being greater than the second intake flow rate, such that the interface between the rings of the bearing receives a greater quantity of lubricant in the first zone than in the second zone.

Thus, the invention makes it possible to optimize the distribution of lubricant in the different zones of the bearing, thereby improving the operation and lifetime of the bearing. The lubrication is done through the fixed ring, below the interface between the rings of the bearing, i.e., below the rolling path when the bearing is a rolling bearing. Since the lubricant tends to migrate by centrifugation from the first zone to the second zone, the channels are distributed so as to bring more lubricant directly into the first zone of the bearing.

According to other advantageous features of the invention, considered alone or in combination:

- The first zone including the first channels and the second zone including the second channels each define an angular sector with an apical angle smaller than or equal to 180 degrees around the central axis.
- The first zone including the first channels and the second zone including the second channels each define an angular sector with an apical angle smaller than or equal to 90 degrees for the first zone and an angular sector with an apical angle smaller than or equal to 150 degrees for the second zone.
- The lubrication system comprises a number of first channels greater than the number of second channels.
- Each of the first channels has a section defining a first diameter, each of the second channels has a section defining a second diameter, and the first diameter is larger than the second diameter.
- Each of the first channels is separated by an angle comprised between 2 and 30 degrees around the central axis relative to an adjacent channel among the first channels, in the clockwise or counterclockwise direction.
- Each of the second channels is separated by an angle comprised between 45 and 75 degrees around the central axis relative to an adjacent channel among the second channels, in the clockwise or counterclockwise direction.
- Each of the first channels is inclined in the clockwise or counterclockwise direction by an angle comprised between 0 and 30 degrees relative to a radial plane comprising the central axis and comprising the junction zone between a first channel and a distributing channel with an annular shape centered on the central axis.
- The lubrication system comprises at least one distributing channel that connects a set of first channels and/or second channels to each other and the overall lubricant flow rate flowing in the distributing channel(s) is greater in the first zone than the second zone.
- The lubrication system comprises several distributing channels positioned along the central axis, including at least one distributing channel that connects a set of first channels and/or second channels to each other and that extends both in the first zone and the second zone.
- The bearing comprises several rows positioned along the central axis and the lubrication system comprises, for each row, at least one distributing channel that connects a set of first channels and/or second channels to each other.
- For each row, the lubrication system comprises a number of first channels greater than the number of second channels.
- The supply channel is connected to distributing channel(s) by junction channels situated in the first zone.
- The bearing is a rolling bearing, while the interface is a rolling path.
- The bearing is a ball joint or a smooth bearing and the interface is a sliding surface.

The fixed ring is the inner ring of the bearing and the pivoting ring is the outer ring of the bearing.

The invention also relates to a machine comprising at least one such mechanical device. As an example, this machine may be a high-power planetary reduction gear.

The invention also relates to a method for implementing a mechanical device as described above. According to the invention, the method comprises at least the following successive steps:

a) forming orifices through the fixed ring of the bearing, these orifices being configured to receive the lubrication system and define the peripheral intake channels bringing a stream of lubricant to the interface between the rings of the bearing;
b) assembling the lubrication system and the bearing; and
c) supplying lubricant to the lubrication system, such that the interface between the rings of the bearing receives a larger quantity of lubricant in the first zone than the second zone.

BRIEF DESCRIPTION OF THE DRAWINGS

The invention will be better understood upon reading the following description, provided solely as a non-limiting example and done in reference to the appended drawings, in which:

FIGS. 1 to 3 show a mechanical device 1 according to the invention.

DETAILED DESCRIPTION OF THE PRESENT INVENTION

Figure 2:
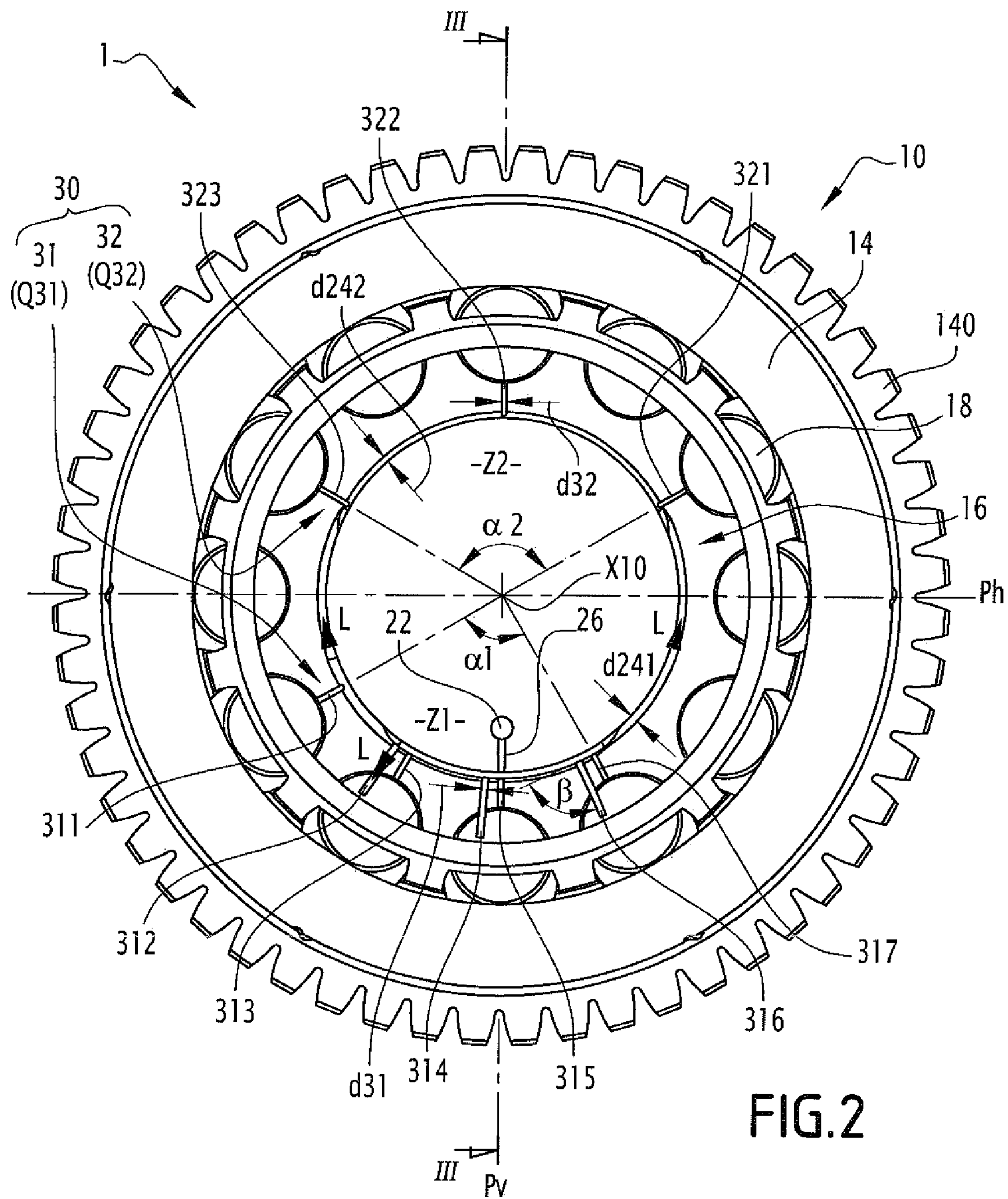
FIG. 2 is a view along arrow II in FIG. 1.

The mechanical device 1 comprises a bearing 10 of the rolling bearing type and a lubrication system 20 suitable for receiving that rolling bearing 10. The device 1, the rolling bearing 10 and the lubrication system 20 are partially shown for simplification purposes, as described below. FIG. 2 shows a vertical plane Pv and a horizontal plane Ph to facilitate spatial identification.

Figure 3:
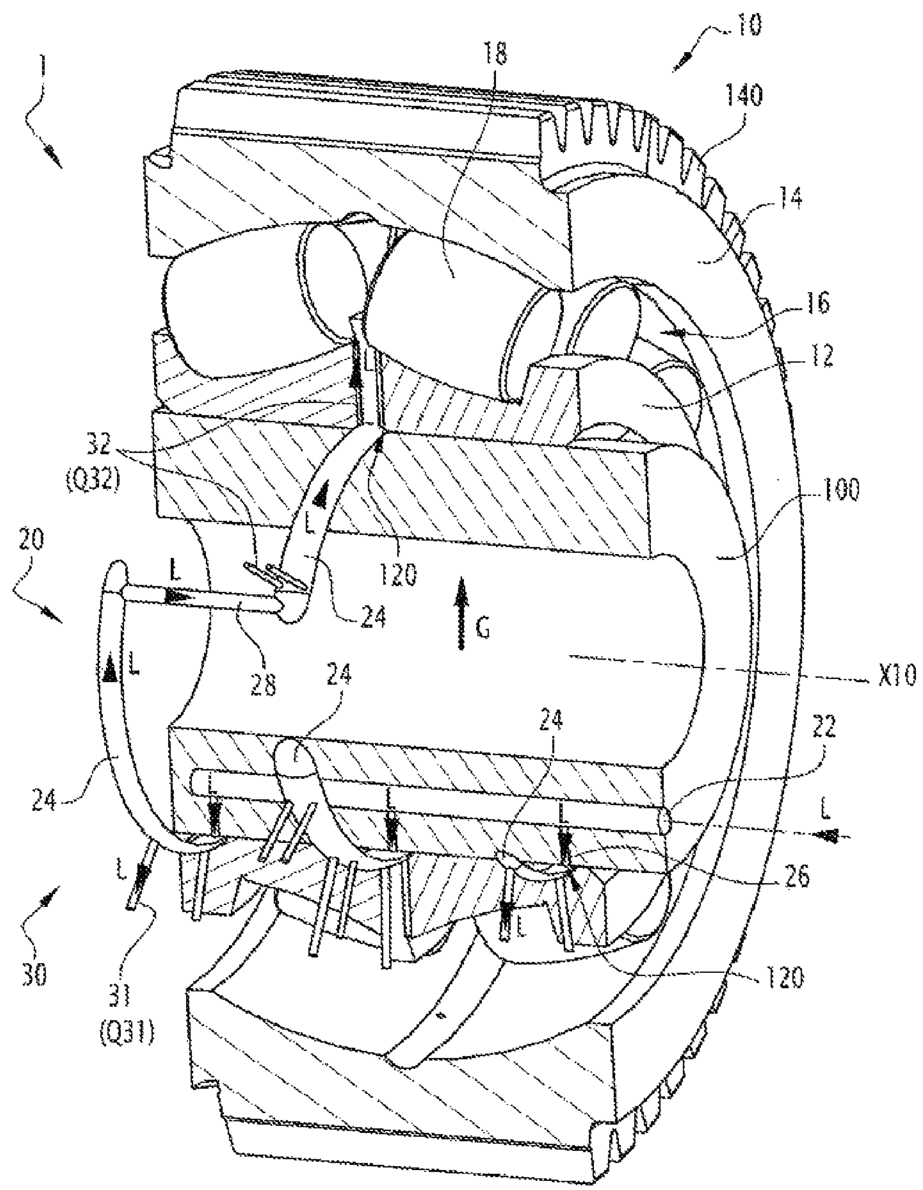
FIG. 3 is a cross-section along line in FIG. 2.

The rolling bearing 10 comprises a fixed inner ring 12, a pivoting outer ring 14 and an interface 16 situated between the rings 12 and 14. The ring 12 is fixed relative to a central axis X10 of the rolling bearing 10, while the ring 14 is rotatable around the central axis X10 of the rolling bearing 10. The interface 16 is formed by a rolling path provided to receive at least one row of rolling elements, for example balls or rollers 18. The inner ring 12 is not shown in FIGS. 1 and 2, while the rollers 18 are not shown in FIG. 1, for simplification reasons. In FIG. 3, a tubular shaft 100 is mounted in the inner ring 12.

Figure 1:
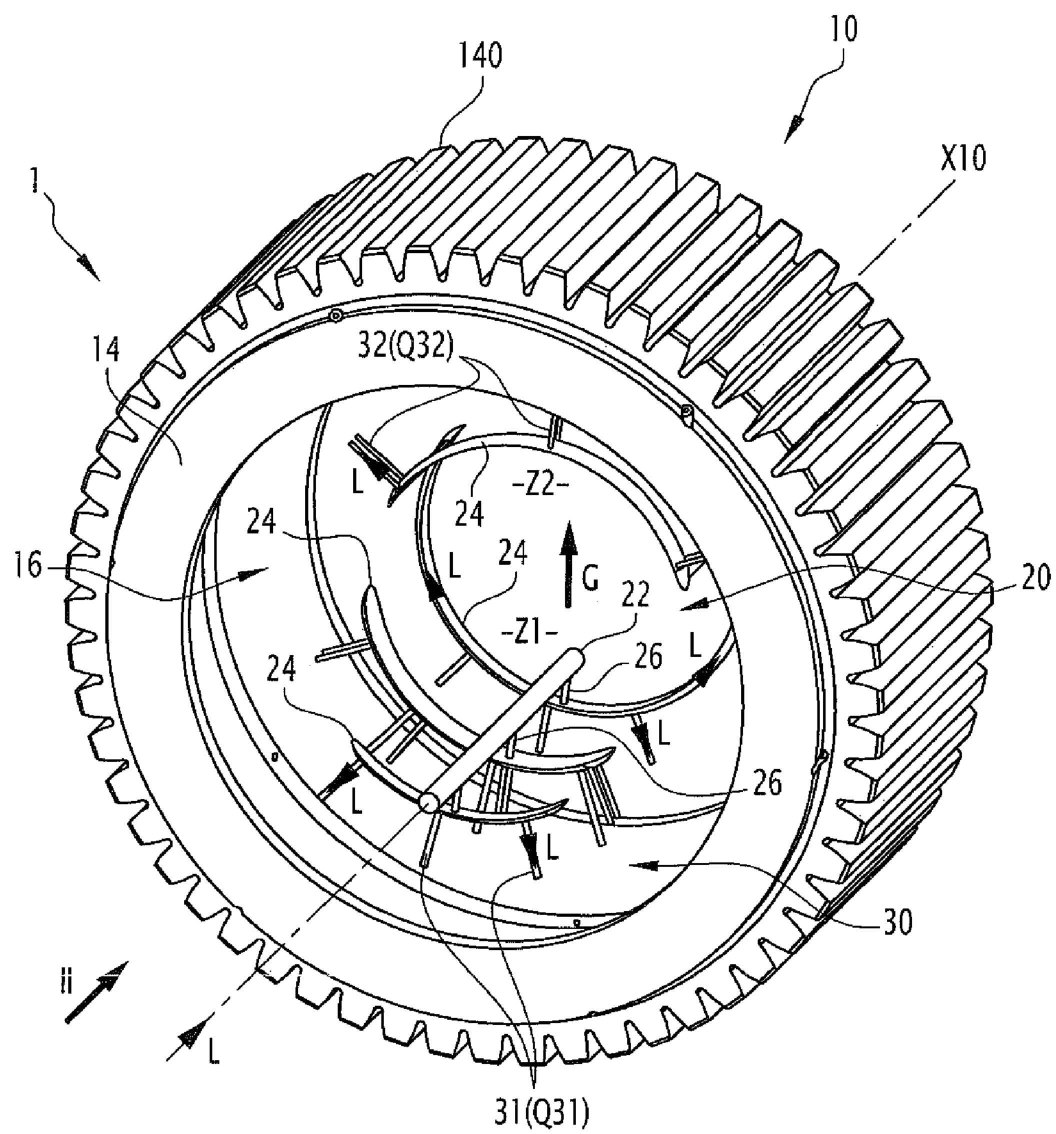
FIG. 1 is a perspective view of a mechanical device according to the invention, comprising a bearing of the rolling bearing type and a lubrication system, partially shown for simplification purposes.

In the example of FIGS. 1 to 3, the mechanical device 1 is provided to equip a planetary reduction gear. To that end, the outer ring 14 of the rolling bearing 10 includes teeth 140. In other words, the outer ring 14 forms a gear.

The lubrication system 20 comprises different types of fluid tunnels or channels 22, 24, 26, 28 and 30, embodied by a lubricant stream L in FIGS. 1 to 3. The flow of the lubricant stream L is depicted by arrows, while the conduits delimiting those channels are not shown in FIGS. 1 to 3, for simplification reasons. These conduits are preferably made from metal or plastic.

The lubrication system 20 is configured to bring the lubricant stream L from a supply channel 22 to the interface 16 formed by a rolling path, through the inner ring 12. The lubrication system 20 comprises the supply channel 22 connected to distributing channels 24 by junction channels 26 and 28, as well as peripheral channels 30 that extend from the distributing channels 24 through the inner ring 12. The supply channel 22 extends parallel to the central axis X10 of the rolling bearing 10. Each of the distributing channels 24 has an annular shape centered on the central axis X10. Radial junction channels 26 extend radially to the axis X10 between the channels 22 and 24. Axial junction channels 28 extend parallel to the axis X10 and the channel 22, between some of the channels 24. The peripheral channels 30 extend radially to the axis X10 from the distributing channels 24, moving away from the axes X10, up to the interface 16 between the rings 12 and 14.

In practice, an acceleration field G tends to push the lubricant stream L from a first zone Z1 to a second zone Z2 of the rolling bearing 10. In the example of FIGS. 1 to 3, the acceleration field G is oriented upward, in connection with the particular application of the mechanical device 1. The zone Z1 may be described as the lower zone, while the zone Z2 may be described as the upper zone. The zones Z1 and Z2 each define an angular sector with an apical angle smaller than or equal to 180 degrees around the central axis X10.

In the context of the invention, the peripheral channels 30 include, on the one hand, first channels 31 that are positioned in the first zone Z1 and second channels 32 that are positioned in the second zone Z2. In the example of FIGS. 1 to 3, the first zone Z1 including the first channels 31 defines an angular sector with an apical angle $\alpha$1 smaller than or equal to 90 degrees around the axis X10, while the second zone Z2 including the second channels 32 defines an angular sector with an apical angle $\alpha$2 smaller than or equal to 150 degrees around the axis X10. In other words, the first channels 31 are distributed in an angular sector with an apical angle $\alpha$1 smaller than or equal to 90 degrees around the axis X10, while the second channels 32 are distributed in an angular sector with an apical angle $\alpha$2 smaller than or equal to 150 degrees around the axis X10. Overall, the zones Z1 and Z2 are diametrically opposite relative to the central axis X10, with a clockwise shift of zone Z1 to counter the effects of the counterclockwise rotation of the outer ring 14 and the mechanical loading of the rolling bearing 10.

The first channels 31 jointly define a first intake flow rate Q31 for bringing lubricant L to the interface 16. The second channels 32 jointly define a second intake flow rate Q32 for bringing lubricant L to the interface 16. According to the invention, the first flow rate Q31 is greater than the second flow rate Q32. Thus, the interface 16 receives a greater quantity of lubricant L in the first zone Z1 relative to the second zone Z2, so as to counter the effects of the acceleration field.

Preferably, the lubrication system 20 comprises a number of first channels 31 greater than the number of second channels 32. Each of the first channels 31 has a section defining a first diameter d31. Each of the second channels 32 has a section defining a second diameter d32. Preferably, the first diameter d31 is larger than the second diameter d32. In the case where the first channels 31 have different diameters d31 from each other and the second channels 32 have different diameters d32 from each other, the smallest of the first diameters d31 is preferably larger than the largest of the second diameters d32.

In the example of FIGS. 1 to 3, the lubrication system 20 comprises four distributing channels 24, the supply channel 22 and the junction channels 26 are positioned only in zone Z1, while the axial junction channels 28 are positioned only in zone Z2. More specifically, the system 20 includes two distributing channels 24 situated in zone Z1, one distributing channel 24 situated in zones Z1 and Z2, and one distributing channel situated in zone Z2. The channels 24 in the first zone Z1 have a section with width d241 radially to the central axis X10. The channel 24 in the first zone Z2 has a section with width d242 radially to the central axis X10. The width d241 is greater than the width d242. Preferably, the overall flow rate of lubricant L flowing in the channels 24 of zone Z1 is greater than the overall flow rate of lubricant L flowing in the channels 24 of zone Z2.

The configuration of the lubrication system 20 makes it possible to maximize pressure losses in zone Z2 relative to zone Z1, i.e., the lubricant L travels for a longer time to reach zone Z2, toward which the acceleration field G pushes it. Without this, the lubricant L would go directly towards zone Z2 without lubricating zone Z1 of the rolling bearing 10.

In FIG. 2, there are seven first channels 31 referenced 311, 312, 313, 314, 315, 316 and 317, and three second channels 32 referenced 321, 322 and 323 in the counterclockwise direction. Other channels 31 and 32 are situated on the same spokes designed around the axis X10 and are not visible in FIG. 2.

In practice, the first channels 31 are generally closer to each other than the second channels 32. Preferably in the context of the invention, each of the first channels 31 is separated by an angle comprised between 2 and 30 degrees around the axis X10 relative to an adjacent channel among the first channels 31, in the clockwise or counterclockwise direction, while each of the second channels 32 is separated by an angle comprised between 45 and 75 degrees around the axis X10 relative to an adjacent channel among the second channels 32, in the clockwise or counterclockwise direction. Furthermore, several channels 31 and/or several channels 32 can be situated in the same plane including the axis X10, as shown in FIG. 2.

In the example of FIGS. 1 to 3, each of the first channels 31 extends radially to the axis X10. For example, FIG. 2 shows an angle β between the channel 316 and a plane tangent to the channel 24 is equal to 90 degrees. In an alternative that is not shown, each of the first channels 31 may be inclined in the clockwise or counterclockwise direction by an angle comprised between 0 and 30 degrees, inclusive, relative to a radial plane comprising the central axis X10 and comprising the junction zone between channels 31 and the channel 24. In that case, the angle β is comprised between 60 and 90 degrees, inclusive. This configuration makes it possible to direct the lubricant stream L leaving the first channels 31 preferably in the clockwise or counterclockwise direction.

In the example of FIG. 3, the channels 22 and 26 extend through the shaft 100, while the channels 24 and 30 extend through the inner ring 12 of the rolling bearing 10. Other arrangements can be considered without going beyond the scope of the invention.

The method for implementing the mechanical device 1 is outlined below.

According to the invention, the method comprises at least the following successive steps a), b) and c).

Step a) consists of forming orifices 120 through the fixed ring 12 of the rolling bearing 10. These orifices 120 are configured to receive the lubrication system 20 and limit the peripheral intake channels 30 for bringing the lubricant stream L to the interface 16 between the rings 12 and 14 of the rolling bearing 10. Step b) consists of assembling the lubrication system 20 and the rolling bearing 10. The conduits of the system 20 are positioned in the inner space defined by the inner ring 12; in particular, the conduits defining the channels 30 are inserted into the orifices 120. Step c) consists of supplying the lubrication system 20 with lubricant L, such that the interface 16 receives a higher quantity of lubricant L in the first zone Z1 than the second zone Z2.

The arrangement of the lubrication system 20 and orifices 120 can be adapted based on the anticipated application of the mechanical device 1, in order to counter the centrifugal effect and optimize the distribution of lubricant L at the interface 16. The behavior of the rolling bearing 10 during use and its lifetime are improved.

Figure 4:
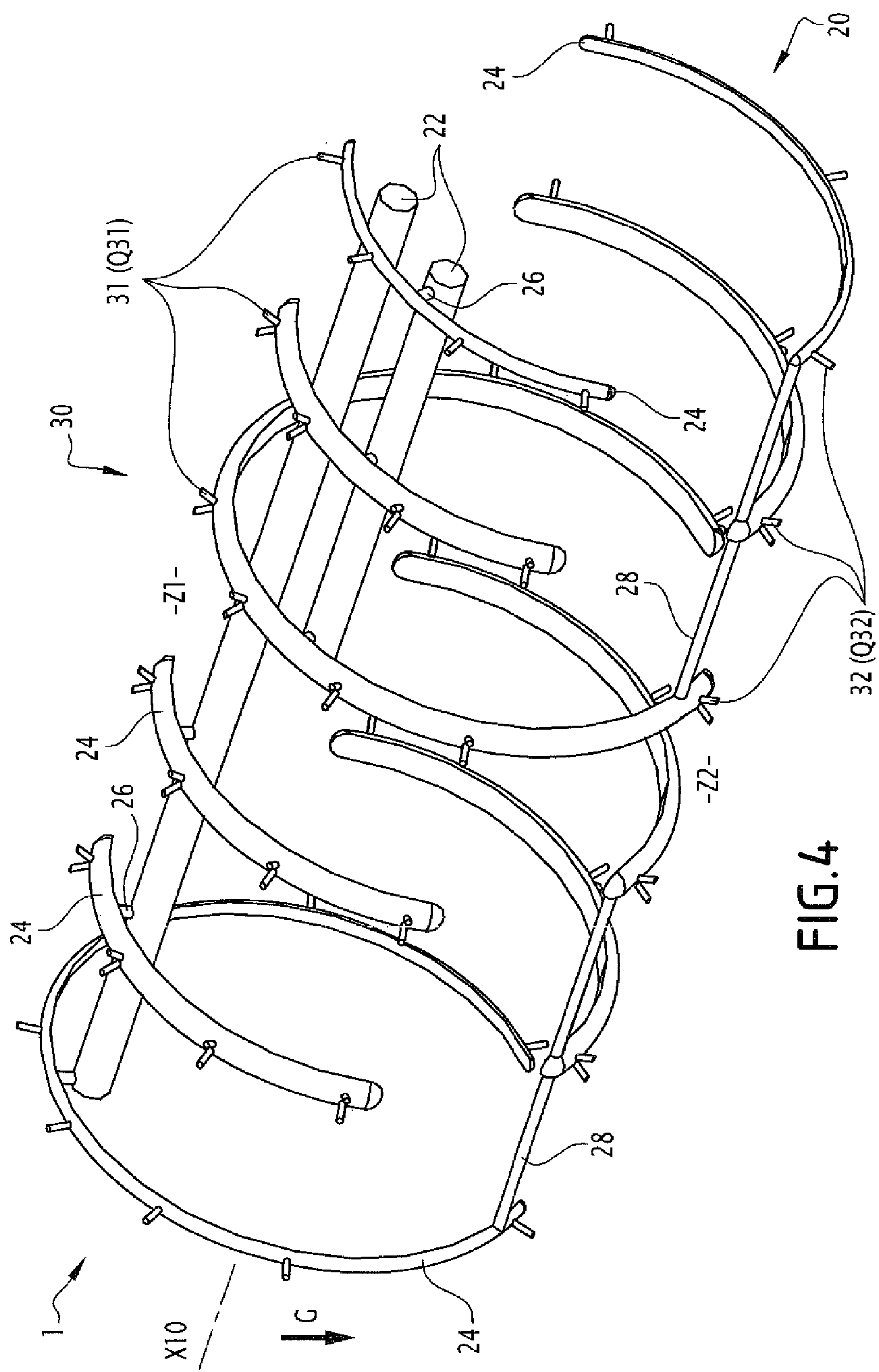
FIG. 4 is another perspective view, from another angle and on another scale, showing a second embodiment of a mechanical device according to the invention, comprising several bearings positioned in parallel and a lubrication system partially shown for simplification purposes.

FIG. 4 shows an alternative mechanical device 1, comprising a bearing with several rows, lubricated by a single lubrication system 20. The acceleration field G is oriented downward. The component elements of the device 1 of FIG. 4 are comparable to those of the first embodiment described above and, for simplification purposes, bear the same numerical references. Also for simplification purposes, the bearing is not shown in FIG. 4, while conduits of the system 20 defining the channels 22, 24, 26, 28 and 30 are shown.

In the device 1 of FIG. 4, the bearing comprises several rows positioned along the central axis X10. In the event the bearing is a rolling bearing, the rows are rows of rolling elements positioned between the inner and outer rings. The lubrication system 20 comprises, for each row, one or two distributing channels 24 that connect a set of first channels 31 and second channels 32 to each other. For each row, the number of first channels 31 is greater than the number of second channels 32.

Furthermore, the mechanical device 1 can be configured differently from FIGS. 1 to 4 without going beyond the scope of the invention.

In one favored embodiment of the mechanical device 1, the lubrication system 20 comprises a set of peripheral channels 30 passing through the fixed inner ring 12 of the bearing 10 and including, on the one hand, first channels 31 that are positioned in a first zone Z1 and that define a first intake flow rate Q31 for bringing lubricant L to the interface 16 and, on the other hand, second channels 32 that are positioned in a second zone Z2 and that define a second intake flow rate Q32 bringing lubricant L to the interface 16, the first flow rate Q31 being higher than the second flow rate Q32, such that the interface 16 between the rings 12 and 14 of the bearing 10 receives a larger quantity of lubricant L in the first zone Z1 than the second zone Z2 of the bearing 10.

In an alternative that is not shown, the inner ring 12 is the rotating or pivoting ring, while the outer ring 14 is the fixed ring of the rolling bearing 10.

According to another alternative that is not shown, during use, the two rings 12, 14 of the rolling bearing 10 rotate or pivot.

According to another alternative that is not shown, the lubrication system 20 includes at least one distributing channel 24 that connects a set of first channels 31 and second channels 32 to each other. The system 20 can include different distributing channels 24, each connecting either channels 31 to each other, or channels 32 to each other, or both channels 31 and 32. Preferably, the overall lubricant flow rate L flowing in the channel(s) 24 is greater in zone Z1 than zone Z2.

According to another alternative that is not shown, the bearing equipping the device 1 can be a ball and socket joint or a smooth bearing. In that case, the interface 16 is a sliding surface.

Furthermore, the technical features of the different embodiments and alternatives mentioned above can be combined in whole or in part. Thus, the mechanical device 1 can be adapted in terms of cost and performance.

The invention claimed is:

1. A mechanical device, comprising:

a bearing including a fixed ring that is fixed to a rotatable shaft and a pivoting ring that are centered on a central axis and include an interface defined between them; and a system for lubricating the interface having only a single supply channel, the system being configured to bring a flow of lubricant from the single supply channel to the interface through the fixed ring, wherein the single supply channel extends in an axial direction, the system comprising a plurality of junction channels that extend radially from the single supply channel, each one of the plurality of junction channels fluidly connect the single supply channel to one of a plurality of distributing channels that extend circumferentially;

the bearing including a first zone and a second zone, each defining an angular sector around the central axis, a first angular sector of the first zone being smaller than a second angular sector of the second zone;

wherein the lubrication system comprises at least a first one of the plurality of distributing channels being located entirely within the first zone and extending circumferentially for a first angle that is less than or equal to ninety (90) degrees around the central axis, a second one of the plurality of distributing channels comprising an axial junction channel extending therefrom and fluidly connecting the second one of the plurality of distributing channels with a third one of the plurality of distributing channels that is located entirely within the second zone and extending circumferentially for a second angle around the central axis, wherein each of the plurality of distributing channels comprise one of a plurality of first peripheral channels or a plurality of second peripheral channels, wherein each of the plurality of first and second peripheral channels extend radially outwardly from their respective distributing channel and pass through the fixed ring, the plurality of first peripheral channels are entirely located within the first zone and define a first intake flow rate for bringing lubricant to the interface, and the plurality of second peripheral channels are entirely located within the second zone and define a second intake flow rate bringing lubricant to the interface, the first intake flow rate being higher than the second intake flow rate, such that the interface between the rings of the bearing receives a larger quantity of lubricant in the first zone than in the second zone, and wherein the first one and the second one of the plurality of distributing channels comprise the plurality of first peripheral channels and the third one of the plurality of distributing channels comprises the plurality of second peripheral channels.

2. The mechanical device according to claim 1, wherein the first angular sector of the first zone has an apical angle and the second angular sector of the second zone has an apical angle, and each of the apical angles are smaller than or equal to 180 degrees around the central axis.

3. The mechanical device according to claim 1, wherein the first angular sector of the first zone including the plurality of first peripheral channels defines an apical angle smaller than or equal to 90 degrees, and the second angular sector of the second zone including the plurality of second peripheral channels defines an apical angle smaller than or equal to 150 degrees including the plurality of second peripheral channels each define an angular sector with an apical angle smaller than or equal to 90 degrees for the first zone and an angular sector with an apical angle smaller than or equal to 150 degrees for the second zone.

4. The mechanical device according to claim 1, wherein the number of the first peripheral channels in the lubrication system is greater than the number of the second peripheral channels in the lubrication system.

5. The mechanical device according to claim 1, wherein each of the plurality of first peripheral channels has a section defining a first diameter, each of the plurality of second peripheral channels has a section defining a second diameter, and the first diameter is larger than the second diameter.

6. The mechanical device according to claim 1, wherein each of the plurality of first peripheral channels is separated by an angle comprised between 2 and 30 degrees around the central axis relative to an adjacent peripheral channel among the first channels, in one of a clockwise direction or a counterclockwise direction.

7. The mechanical device according to claim 1, wherein each of the plurality of second peripheral channels is separated by an angle comprised between 45 and 75 degrees around the central axis relative to an adjacent peripheral channel among the second channels, in one of a clockwise direction or a counterclockwise direction.

8. The mechanical device according to claim 1, wherein each of the plurality of first peripheral channels is inclined in one of a clockwise direction or a counterclockwise direction by an angle comprised between 0 and 30 degrees relative to a radial plane comprising the central axis.

9. The mechanical device according to claim 1, wherein the overall lubricant flow rate flowing in the plurality of distributing channels is greater in the first zone than the second zone.

10. The mechanical device according to claim 1, wherein the second one of the plurality of distribution channels is the only one of the plurality of distribution channels that extends both in the first zone and the second zone.

11. The mechanical device according to claim 1, wherein the second one of the plurality of distributing channels fluidly connects one of the plurality of first peripheral channels and the plurality of second peripheral channels to each other.

12. The mechanical device according to claim 11, wherein the number of the first peripheral channels in the lubrication system is greater than the number of the second peripheral channels in the lubrication system greater than the number of second peripheral channels in the lubrication system.

13. The mechanical device according to one of claim 1, wherein the third one of the plurality of distribution channels is only connected to the single supply channel by the axial junction channel such that lubricant in the single supply channel must travel a greater distance to reach the third one of the plurality of distribution channels than for the lubricant to reach the first and second ones of the plurality of distribution channels.

14. The mechanical device according to claim 1, wherein the bearing is a rolling bearing, wherein the interface is a rolling path.

15. The mechanical device according to claim 1, wherein the interface is a sliding surface.

16. The mechanical device according to claim 1, wherein the fixed ring is an inner ring of the bearing and the pivoting ring is an outer ring of the bearing.

17. A method for implementing a mechanical device having:

a bearing including a fixed ring that is fixed to a rotatable shaft and a pivoting ring that are centered on a central axis and include an interface defined between them; and a system for lubricating the interface having only a single supply channel, the system being configured to bring a flow of lubricant from the single supply channel to the interface through the fixed ring, wherein the single supply channel extends in an axial direction, the system comprising a plurality of junction channels that extend radially from the single supply channel, each one of the plurality of junction channels fluidly connect the single supply channel to one of a plurality of distributing channels that extend circumferentially;

the bearing including a first zone and a second zone, each defining an angular sector around the central axis, a first angular sector of the first zone being smaller than a second angular sector of the second zone;

wherein the lubrication system comprises at least a first one of the plurality of distributing channels being located entirely within the first zone and extending circumferentially for a first angle that is less than or equal to ninety (90) degrees around the central axis, a second one of the plurality of distributing channels comprising an axial junction channel extending therefrom and fluidly connecting the second one of the plurality of distributing channels with a third one of the plurality of distributing channels that is located entirely within the second zone and extending circumferentially for a second angle around the central axis, wherein each of the plurality of distributing channels comprise one of a plurality of first peripheral channels or a plurality of second peripheral channels, wherein each of the plurality of first and second peripheral channels extend radially outwardly from their respective distributing channel and pass through the fixed ring, the plurality of first peripheral channels are entirely located within the first zone and define a first intake flow rate for bringing lubricant to the interface, and the plurality of second peripheral channels are entirely located within the second zone and define a second intake flow rate bringing lubricant to the interface, the first intake flow rate being higher than the second intake flow rate, such that the interface between the rings of the bearing receives a larger quantity of lubricant in the first zone than in the second zone, and wherein the first one and the second one of the plurality of distributing channels comprise the plurality of first peripheral channels and the third one of the plurality of distributing channels comprises the plurality of second peripheral channels, the method comprising successive steps of:

a) forming orifices through the fixed ring of the bearing, these orifices being configured to receive the lubrication system and define the plurality of first and second peripheral channels bringing the flow of lubricant to the interface between the rings of the bearing;

b) assembling the lubrication system and the bearing; and c) supplying lubricant to the lubrication system, such that the interface between the rings of the bearing receives the larger quantity of lubricant in the first zone than the second zone.

* * * * *